United States Patent
Zoellner et al.

(10) Patent No.: US 7,610,285 B1
(45) Date of Patent: Oct. 27, 2009

(54) SYSTEM AND METHOD FOR CLASSIFYING OBJECTS

(75) Inventors: Keith Zoellner, Austin, TX (US); Peter Lee, Pflugerville, TX (US); Brad Might, Round Rock, TX (US)

(73) Assignee: Stored IQ, Austin, TX (US)

( * ) Notice: Subject to any disclaimer, the term of this patent is extended or adjusted under 35 U.S.C. 154(b) by 246 days.

(21) Appl. No.: 11/524,831

(22) Filed: Sep. 21, 2006

Related U.S. Application Data (60) Provisional application No. 60/719,058, filed on Sep. 21, 2005.

(51) Int. Cl.
*G06F 17/30* (2006.01)
(52) U.S. Cl. .................................. 707/7; 707/10
(58) Field of Classification Search .............. 707/7
See application file for complete search history.

(56) References Cited

U.S. PATENT DOCUMENTS

| | | | |
|---|---|---|---|
| 6,205,543 B1 * | 3/2001 | Tremblay et al. | 712/228 |
| 2004/0098415 A1 * | 5/2004 | Bone et al. | 707/200 |
| 2006/0020646 A1 * | 1/2006 | Tee et al. | 707/205 |
| 2006/0168589 A1 * | 7/2006 | Moore | 719/315 |

* cited by examiner

*Primary Examiner*—Pierre M Vital
*Assistant Examiner*—Sabana Rahman
(74) *Attorney, Agent, or Firm*—Sprinkle IP Law Group (57) ABSTRACT

Embodiments of a classification pipeline disclosed herein have the ability to both collect data as it occurs and dynamically redact it, allowing ongoing statistics to be gathered and maintained while simultaneously constraining the total amount of storage capacity that must be dedicated to such a purpose. Various types of information can be extracted from or obtained on the object through the classification pipeline. In one embodiment, the classification pipeline comprises a plurality of layers implemented as a set of services available to network clients through a Web interface or an Applications Programming Interface (API). Each client can subscribe to one or more layers of the classification pipeline at their leisure and tailor their classification pipeline configuration through the interface. The classification pipeline can be configured to collaborate with other software to provide a consistent snapshot of the state of a network environment based on data collected at the time.

19 Claims, 7 Drawing Sheets

| Classification Pipeline 300 | Object Classification Rules Engine 326 | | | |
|---|---|---|---|---|
| | Entity Processing 305 | User Level Entity Assertion 324 | | |
| | | Proximity Analysis 322 | | |
| | | Filtering/Scoping 320 | | |
| | Content-based Metadata Processing 303 | Keyword Extraction 314 | Raw Entity Extraction 316 | Text Pattern Extraction 318 |
| | | Text Conversion 312 | | |
| | | Content Typing 310 | | |
| | | Duplicate Hash Computation 308 | | |
| | Object System Metadata Processing 301 | User Directory Extraction 306 | | |
| | | Security Extraction 304 | | |
| | | Object System Metadata Extraction 302 | | |

SYSTEM AND METHOD FOR CLASSIFYING OBJECTS

CROSS-REFERENCE TO RELATED APPLICATIONS

The present application claims priority from U.S. Provisional Patent Application No. 60/719,058, filed Sep. 21, 2005, entitled "SYSTEM AND METHOD FOR CLASSIFYING OBJECTS," the entire content of which is incorporated herein by reference for all purposes.

FIELD OF THE INVENTION

The present invention relates generally to managing and controlling data storage resources. More specifically, the present invention relates to systems, methods and apparatuses for filtering and classifying objects in file systems or file based data storage media utilizing metadata and/or content of the files and other objects stored in the file systems or file-based data storage media.

BACKGROUND OF THE INVENTION

Today's computers require memory to hold or store both the steps or instructions of programs and the data that those programs take as input or produce as output. This memory is conventionally divided into two types, primary storage and secondary storage. Primary storage is that which is immediately accessible by the computer or microprocessor, and is typically though not exclusively used as temporary storage. It is, in effect, the short term memory of the computer.

Similarly, secondary storage can be seen as the long-term computer memory. This form of memory maintains information that must be kept for a long time, and may be orders of magnitude larger and slower. Secondary memory is typically provided by devices such as magnetic disk drives, optical drives, and so forth. These devices present to the computer's operating system a low-level interface in which individual storage subunits may be individually addressed. These subunits are often generalized by the computer's operating system into "blocks," and such devices are often referred to as "block storage devices."

Block storage devices are not typically accessed directly by users or (most) programs. Rather, programs or other components of the operating system organize block storage in an abstract fashion and make this higher-level interface available to other software components. The most common higher-level abstraction thus provided is a "filesystem." In a filesystem, the storage resource is organized into directories, files, and other objects. Associated with each file, directory, or other object is typically a name, some explicit/static metadata such as its owner, size, and so on, its contents or data, and an arbitrary and open set of implicit or "dynamic" metadata such as the file's content type, checksum, and so on. Directories are containers that provide a mapping from directory-unique names to other directories and files. Files are containers for arbitrary data. Because directories may contain other directories, the filesystem client (human user, software application, etc.) perceives the storage to be organized into a quasi-hierarchical structure or "tree" of directories and files. This structure may be navigated by providing the unique names necessary to identify a directory inside another directory at each traversed level of the structure; hence, the organizational structure of names is sometimes said to constitute a "filesystem namespace."

Filesystems support a finite set of operations (such as create, open, read, write, close, delete, etc.) on each of the abstract objects which the filesystem contains. For each of these operations, the filesystem takes a particular action in accordance with the operation in question and the data provided in the operation. The sequence of these operations over time affects changes to the filesystem structure, data, and metadata in a predictable way. The set of filesystem abstractions, operations, and predictable results for particular actions is said to constitute "semantics" for the filesystem. While particular filesystems differ slightly in their precise semantics, in general filesystems implement as a subset of their full semantics a common semantics. This approximately equivalent common semantics can be regarded as the "conventional" or "traditional" filesystem semantics.

Storage resources accessed by some computer, its software or users need not be "directly" attached to that computer. Various mechanisms exist for allowing software or users on one computing device to access over a network and use storage assets that are actually located on another remote computer or device. There are many types of remote storage access facilities, but they may without loss of generality be regarded to fall into one of two classes: block-level and file-level. File-level remote storage access mechanisms extend the filesystem interface and namespace across the network, enabling clients to access and utilize the files and directories as if they were local. Such systems are therefore typically called "network file systems." Note that the term "network file system" is used herein generally to refer to all such systems—there is a network file system called Network File System or NFS, originally developed at Sun Microsystems and now in the public domain. When discussing the general class of such systems herein, the lower-case term, e.g., "networked file systems" will be used. When discussing the specific Sun-developed networked file system, the fully capitalized version of the term or its acronym, e.g., "Network File System or NFS" will be used.

Networked file systems enable machines to access the filesystems that reside on other machines. Architecturally, this leads to the following distinctions: in the context of a given filesystem, one machine plays the role of a filesystem "origin server" (alternatively, "fileserver" or "server") and another plays the role of a filesystem client. The two are connected via a data transmission network. The client and server communicate over this network using standardized network protocols; the high-level protocols which extend the filesystem namespace and abstractions across the network are referred to as "network filesystem protocols." Exemplary filesystem protocols include the Common Internet File System (CIFS), the aforementioned NFS, Novell's Netware filesharing system, Apple's Appleshare, the Andrew File System (AFS), and the Coda Filesystem (Coda). CIFS and NFS are by far the most prevalent. These network filesystem protocols share an approximately equivalent semantics and set of abstractions, but differ in their details and are noninteroperable. Thus, to use a filesystem from a fileserver, a client must "speak the same language," i.e., have software that implements the same protocol that the fileserver uses.

A fileserver indicates which portions of its filesystems are available to remote clients by defining "exports" or "shares." To access a particular remote fileserver's filesystems, a client must then make those exports or shares of interest available by including them by reference as part of their own filesystem namespace. This process is referred to as "mounting" or "mapping (to)" a remote export or share. By mounting or mapping, a client establishes a tightly coupled relationship with the particular file server. The overall architecture can be characterized as a "two-tier" client-server system, since the client communicates directly with the server which "has" the resources of interest to the client.

In addition to organizing and maintaining the relationships between filesystem clients and file servers, additional challenges exist in managing access to and utilization of filesystems. While most organizations have and enforce stringent document workflow and retention policies for their paper files, similar policies—while desired and mandated—are rarely enforced for electronic files. As a non-limiting example, many corporations have a policy that prohibits the usage of corporate storage capacity on fileservers for the storage of certain personal files and content types, for instance, digital music in MP3 format, personal digital images, and so on. This "policy" usually takes the form of a memo, email, entry in a company policy manual, etc. The administrators in charge of enforcing this policy face significant challenges. Conventional filesystems do not provide mechanisms for configuring a filesystem to only allow particular content types or otherwise make decisions about what should be stored, where, and how. These conventional filesystems are static, and the set of semantics for access and other administrative controls are rather limited. Thus any such policy enforcement that happens is done retroactively and in an ad-hoc manner via manual or mostly-manual processes. The net result is that network file storage fills up with old, duplicated, and garbage files that often violate corporate and administrative utilization policies.

In today's increasingly litigious environment and in the presence of new rules and regulations such as the Health Insurance Portability and Accountability Act of 1996 (HIPAA) and the Sarbanes-Oxley Act of 2002, the lack of management, including the inability to enforce policies consistently and effectively, represents a serious risk that corporations and businesses alike must rush to address. Unfortunately, as a direct result of the general lack of innovation and improvement in filesystem architecture over the last 30 years, viable solutions that could provide practical and effective policy management to enterprises do not seem to exist.

Perhaps a general comparison between typical databases systems and typical filesystems could provide an insight as to the lack of innovation and improvement in filesystem architecture. For databases, storage is usually organized into tables arranged in a flat space (i.e., tables may not be contained in other tables) which contain records with generally fixed form. Such database systems often provide a notion of "triggers" and "stored procedures." Triggers define a set of conditions; when the database is manipulated in a way that matches some condition, the stored procedure associated with that trigger is executed, potentially modifying the transaction or operation. This mechanism is used primarily in two ways in database applications: to ensure data correctness and integrity and to automate certain administrative and application-specific tasks. The analogous facility is not available in filesystems because filesystems are quasi-hierarchical collections of directories and files. As such, triggers cannot be generally or easily defined with associated stored procedures that can be automatically activated and enacted synchronous with a filesystem activity in any extant filesystem.

In general, implementation of triggers and stored procedures in filesystems is significantly more complex than in databases systems because of less regular structure of filesystems, their less formally well-defined semantics, and because file data is itself arbitrarily semi-structured and loosely typed. Implementation of programmable procedures which respond to an arbitrary filesystem operation by modifying the operation is challenging when the correct (i.e., traditional, expected, etc.) semantics of filesystems must be preserved. There are existing systems that will generate "events" when operations occur on the filesystem; these events can then be used to activate arbitrary actions post-facto. However, the actions cannot themselves modify the file operation, since the event which activates them is not generated until the triggering operation completes.

Currently, the "intelligence" that a conventional filesystem exhibits with respect to access control is typically restricted to a static set of rules defining file owners, permissions, and access control lists. To the extent even this relatively low level of "intelligence" exists, it is usually statically defined as a part of the filesystem implementation and may not be extended.

In a typical enterprise, the files and directories stored in the enterprise filesystems represent unstructured or semi-structured business intelligence, which comprises the work product and intellectual property produced by its knowledge workers. The work product may include business-critical assets and may range from Excel spreadsheets representing (collectively) the financial health and state of the enterprise to domain-specific artifacts such as Word documents representing memos to customers. However, in contrast to the data stored in "mission critical" information systems such as logistics systems, inventory systems, order processing systems, customer service systems, and other "glass house" applications, the unstructured and semi-structured information stored in the enterprise filesystems is largely "unmanaged." It is perhaps backed up but little or no effort is made to understand what the information is, what its relevance or importance to the business might be, or even whether it is appropriately secured.

As examples, assuming that a user 'Idunno' has stored unauthorized and illegal copies of MP3 music files in a "home directory" on some file server that belong to a corporation 'Big Corp' where Idunno works. In doing so, Idunno has perhaps violated a corporate policy of Big Corp stating that no MP3 files are to be stored on the network. However, the system managers may have no knowledge to this violation, nor any automated means of remedying the situation. Even in the event that the system managers are able to episodically inventory the filesystems for such violators, they are often loathe to automatically take appropriate actions (e.g., deleting) on such offending files. The reason is that, more often than not, while they have the responsibility for enforcing such policies, they do not have the authority to do so. To remedy this, the end-user (i.e., the file owner—in this example, Idunno) or some other responsible party must be brought "into the loop." Other examples of file management policies might include: documents relating to patients' individual medical conditions within a healthcare provider business might be stored in such a way that perhaps would violate the privacy constraints of HIPAA; or financial documents within the finance operation of a Fortune 2000 company might be stored in such a way that perhaps would violate both regulatory requirements under the Sarbanes-Oxley Act of 2002 and internal corporate governance considerations.

The pressing need to monitor filesystems and to report activities related to the filesystems presents a challenge of unprecedented scope and scale on many fronts. Filesystem activity produces changes to the state of a filesystem. This activity can affect changes to the structure, the stored metadata, and the stored data of the directories and files. Generally speaking, this activity is not logged in any way; rather, the filesystem itself holds its current state. Some filesystems—called "journaling" filesystems—maintain transient logs of changes for a short duration as a means of implementing the filesystem itself; however, these logs are not typically organized in any way conducive to monitoring and reporting on the state of the filesystem and its activity and are not made available to external programs for that purpose. Further, these logs are frequently purged and therefore provide a poor basis for reporting of historical and trend data.

One significant and open problem is that of collection, redaction, and analysis of high-level data about what a filesystem is being used for, what is stored in it, by whom and for what purpose. Solutions today involve software programs or users explicitly walking through the filesystem structure, gathering the data required, and then analyzing it and/or acting on it, etc. Collection of filesystem data proactively as operations occur is generally not done as it is generally not supported by the filesystem itself. Furthermore, the accuracy of such collected data is usually questionable, as it reflects not an instantaneous state of the filesystem at any given moment, but, rather, an approximate state of the filesystem over the duration of the run. Without collecting and maintaining the appropriate statistics as file operations occur, it is impossible for the data, at the end of the run, to represent a correct and accurate picture of the contents of the filesystem at that time.

The problem of data collection and reporting is further compounded in the network filesystem environment. Because each server—indeed, each filesystem on each server—is a separate entity, it is therefore necessary to perform each data collection independently on each server. If reporting or monitoring is to be done across the network filesystem environment, significant challenges exist; namely, because of the parallel and discrete nature of the collection runs, it becomes difficult or impossible to sensibly merge the collected data into a consistent snapshot of the state of the filesystem at some time.

It is further the case that collection and storage of all such data as it occurs could be untenably burdensome; such logs would "grow" quickly and consume additional storage capacity at an undesirable rate. A need exists for a system and method that would allow ongoing statistics to be gathered and maintained while simultaneously constraining the total amount of storage capacity that must be dedicated to such a purpose. Embodiments of the present invention address this need and more.

SUMMARY OF THE INVENTION

One aspect of the invention is directed to a classification engine having the ability to both collect data as it occurs and dynamically redact or "historicize" it, allowing ongoing statistics to be gathered and maintained while simultaneously constraining the total amount of storage capacity that must be dedicated to such a purpose. In one embodiment, the classification engine is operable to extract various types of information from an object (e.g., a document, a file, a unit of data, etc.). In one embodiment, the classification engine is operable to tag various types of information (e.g., system information, security information, content information, etc.) extracted from or otherwise obtained on the object.

One embodiment of the invention provides a system and method for exposing or opening up the classification engine across a network through an interface. Through the interface, the functionality of the classification engine can be made available as a set of services (e.g., extraction, tagging, classification, etc.) to a plurality of clients in a distributed computing environment. One embodiment of the interface allows clients in a networking environment to plug in and use the functionality of the classification engine at their leisure.

According to embodiments of the invention, the interface can be implemented in various ways. For example, it can be a Web interface including but not limited to XML over HTTP, XML RPC, SOAP, any form of remote procedural call interface, an Applications Programming Interface (API), etc. The API can be configured to operate synchronously or asynchronously.

In one embodiment, the functionality of the classification engine is implemented in a pipeline software construct or framework which provides for optimal configurability and extensibility. In one embodiment, the classification pipeline can be implemented as a piece of software which allows new functionality (e.g., disambiguity, content-based hashing, etc.) to be added or otherwise readily adapted. The classification pipeline software framework can also provide clients with the ability to customize a list of services and configure how these services should perform and/or upon what information these services should perform.

In some embodiments of the invention, actions (e.g., executing a business policy, harvesting metadata, generating a report, etc.) may be taken based upon the classification of object(s) or based upon metadata associated with the object (s). Such actions may generate additional metadata about the object(s) which can be recursively sent back to the classification pipeline. For example, in extracting system metadata for an object, various types of attributes of the object can be analyzed and classification applied. Conditions on these attributes (e.g., how many instances are there, etc.) may be obtained by or submitted to a policy engine which may generalize the attributes based on the conditions and recursively send them back into the classification engine again. If reporting or monitoring is to be done across a particular network environment, the classification pipeline can be configured to collaborate with other software in the network environment to provide a consistent snapshot of the state of that particular network environment based on data collected at the time.

Embodiments of the classification pipeline disclosed herein can provide many advantages. One advantage is that the classification pipeline can provide comprehensive insight on the collected data. More specifically, embodiments of the invention can provide a classified object with multi-dimensional context, including the context of filesystem metadata, the context of security information, the context of directory information about who people are in an organization, the context of entities (e.g., content, keywords, regular expressions, etc.) extracted from or otherwise obtained on an object (e.g., a document, a file, etc.), and so on.

Another advantage relates to configurability. Embodiments of the classification pipeline disclosed herein can be readily configured by a plurality of clients across a network. Each client can choose what functionality of the classification pipeline to apply and how.

Yet another advantage the invention is directed to adaptability, which can translate into cost savings in implementation. The classification pipeline software construct disclosed herein allows a new functionality (i.e., a piece of software) to be inserted into the classification pipeline as a service, a layer, a stack, a stage, or a metadata space. As such, embodiments of the classification pipeline can be readily modified or otherwise updated to adapt to changes (e.g., changes in classification requirements due to a new business policy, a new privacy regulation and/or a new discovery rule, etc.).

Another advantage of the invention is directed to extensibility. Embodiments of the classification pipeline disclosed herein can be presented as services across a network environment, allowing a multitude of clients to subscribe to or acquire multiple classification services. As discussed above, each client can customize or otherwise configure its classification pipeline across the network environment to set classification requirements, create a new vocabulary for desired information, insert a new functionality, etc.

Other objects and advantages of the present invention will become apparent to one skilled in the art upon reading and understanding the detailed description of the preferred embodiment(s) described herein with reference to the following drawings.

BRIEF DESCRIPTION OF THE DRAWINGS

A more complete understanding of the present invention and the advantages thereof may be acquired by referring to the following description, taken in conjunction with the accompanying drawings in which like reference numbers indicate like features.

DETAILED DESCRIPTION

The present invention and various features and advantageous details thereof will now be described with reference to the exemplary, and therefore non-limiting, embodiments that are illustrated in the accompanying drawings. Descriptions of known programming techniques, computer software, hardware, network communications, operating platforms and protocols may be omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before describing embodiments of the invention in detail, it might be helpful to clarify a few terms used in this disclosure. A "file classification" can have one or more file attributes and can be associated with one or more volumes. A volume is a mountable share where objects (e.g., subject files) reside on a server. A file attribute is an entity, an instance of a file classification or file system metadata. The term "file system metadata" or its acronym "FSMD" encompasses file system attributes that embodiments of the invention maintain about files. An exemplary list of file system attributes implementing embodiments of the invention can be found in the User's Guide, StoredIQ Appliance 4.0, July 2006 edition, pp. 106-125, attached as appendix A to the present application. FSMD may comprise metadata such as access and creation times, file size, etc. A content-based entity is an instance of data, type of entity, location of entity, or data match. Examples of entities can be found in the aforementioned User's Guide.

Attention is now directed to systems, methods and apparatuses for a classification pipeline configured to provide a set of tagging and extraction services. The classification pipeline disclosed herein may be embodied in computer-executable program instructions residing on computer-readable media. In one embodiment, a system implementing the classification pipeline disclosed herein is programmed with computer-executable program instructions for extracting and/or analyzing the data of files or other objects in the filesystem (collectively referred to as objects) or metadata pertaining to these objects, in order that the objects may be classified and/or certain actions taken based on the classification of the object. Actions (e.g., executing a business policy, harvesting metadata, generating a report, etc.) may be taken based upon the classification of the object or based upon metadata associated with the objects.

In embodiments of the invention, the tagging and extraction services provided by the classification pipeline are made available to one or more clients (i.e., machines running client software) through an interface. In the present disclosure, this interface is interchangeably referred to as the "classification pipeline interface" or simply "the interface". The interface may be implemented in various ways. For example, it may be implemented as an application web interface or an Applications Programming Interface (API). It may be implemented as a single synchronous interface or a set of asynchronous interfaces. One example of a synchronous interface for a classification pipeline is described below with reference to FIG. 1. One example of a set of asynchronous interfaces for a classification pipeline is described below with reference to FIG. 2. In both examples, the classification pipeline configuration can be controlled through the interface, which is implemented as an API exposed as a series of XML request and replies over TCP.

A synchronous interface implementing embodiments of the invention may comprise two components: the Classify Object Request and the Classify Object Response. The Classify Object Request is designed to pass a set of parameters to the classification pipeline for a single file. The metadata for the specified file is extracted and passed back to the requesting application on the Classify Object Response. The interface of this type may be referred to as an "Object_Classify_Request interface".

In one embodiment, the Classify Object Request can pass at least two types of parameters: required and optional. Required parameters may include File Name (i.e., the name of the file to be classified) and Volume (i.e., the volume where the file is located.) The File Name parameter could be fully qualified relative to the context provided by the Volume parameter. In one embodiment, the Volume parameter refers to a volume defined within an appliance that is hosting the pipeline (e.g., a StoredIQ appliance), in which case, a volume must first be defined on that appliance (e.g., using the StoredIQ user interface) before it can be given as a parameter. Various volume types (e.g., CIFS, NFS, Netware, Centera, Exchange, etc.) may be implemented in embodiments of the invention. Examples of volume configuration options can be found in the aforementioned User's Guide, StoredIQ Appliance 4.0, July 2006 edition, pp. 36-39.

Optional parameters for the Classify Object Request may include:
Pipeline Profile Name—Refers to the name of a pipeline profile that is defined on the appliance hosting the classification pipeline. The pipeline profile determines what sets of metadata the client application will receive from the classification pipeline. Using the StoredIQ appliance as an example, the pipeline profile is set up in the System Configuration tab of the StoredIQ user interface. If no pipeline profile name is passed, the default is to provide all sets of metadata. Other configurations are possible.

Object System Metadata—This parameter includes data such as file size, access times, and modified times. The data will vary depending upon the underlying object system (e.g., CIFS, NFS, Netware, etc.). Embodiments of the classification pipeline are configured to extract all types of metadata. In cases where user(s) inherently have object system metadata "in hand" (e.g., as a function of learning or acquiring the name of the file to be classified), the classification pipeline is operable to allow the user(s) to pass the user-acquired data into the pipeline.

External Metadata—This parameter provides a mechanism for client applications to pass in metadata that is not created by the pipeline per se, but can be referenced within the object classification rules engine to assist in the classification processing.

There are many different types of metadata, including metadata about electronic documents created by client applications. Document metadata describes document attributes such as the title, author, content, location, and date of creation. Since it is often possible to view a history of every change ever made to an electronic document during its lifetime, acquiring this type of information can help in "historicizing" and/or classifying the document. Document metadata can include edits and comments made by the author and other users to a document as well as hidden information about the document. Exemplary document metadata may include one or more of the following: text changes, comments, document versions, document revisions, template information, file properties and summary information, author's name, author's initials, author's email address, company or organization's name, name of the computer on which it is created, name of the hard disk, volume, or network server on which the document is saved, routing information, names of previous authors, hyperlinks, macros, hidden text, and non-visible portions of embedded Object Linking and Embedding (OLE) objects, etc.

Figure 1:
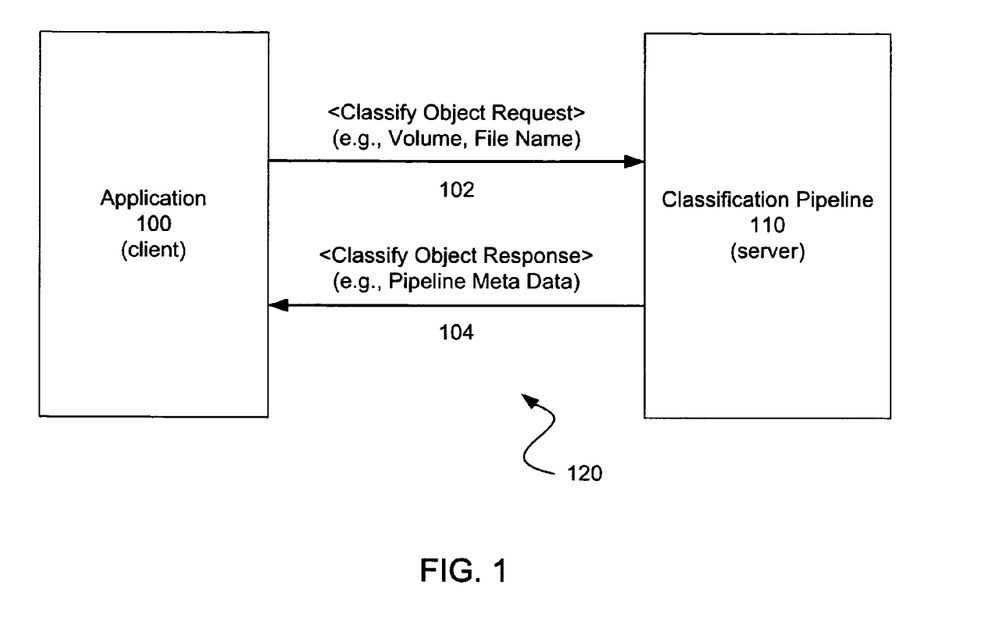
FIG. 1 depicts a block diagram illustrating a synchronous integration flow of a classification pipeline according to one embodiment of the present invention.

FIG. 1 depicts a block diagram illustrating a synchronous integration flow of a classification pipeline according to one embodiment of the present invention. API 120 can be used by any type of software application to interface with the classification pipeline. For example, Application 100 may wish to receive information pertaining to a certain object or to a certain location on a particular filesystem. More details on the term "object" will be described below with reference to FIGS. 3-5. To obtain this information on the object, Application 100 may send a <Classify Object Request> 102 ("request 102") to Classification Pipeline 110 with information pertaining to the object on which Application 100 wishes to receive information. The information pertaining to the object sent via request 102 may include information such as the volume on which the object is located or the name of the object.

To facilitate the sending of request 102 (and possibly of response 104 to request 102), request 102 may be formulated according to API 120 or any suitable API that Classification Pipeline 110 is operable to implement. Classification pipeline 110 may then obtain or extract metadata on or about the object, and/or classify the object according to a set of classification parameters. In one embodiment, the metadata extracted or obtained on the object may be dependent on a level of service specified in conjunction with Classification Pipeline 110.

In response to request 102, Classification Pipeline 110 may send a <Classify Object Response> 104 ("response 104"). Response 104 may contain information pertaining to the object on which information was requested in request 102. This information on the object may be metadata pertaining to the object (e.g., Pipeline Metadata) or data contained by the object, or a classification of the object, or tagged entities that were found within the content of the object. In one embodiment, metadata in response 104 may be formulated as an XML string.

The interaction with Classification Pipeline 110 depicted in FIG. 1 may occur in a synchronous manner. In other words, Application 100 may send request 102 to Classification Pipeline 110, which in turn will respond with response 104 to the same Application 100 when metadata has been obtained on the object, or the object has been classified. In some cases, however, it may be desirable to have separate, asynchronous interactions, such that a request pertaining to an object may be sent by one application and the metadata or classification information about that object may be sent to, or obtained by, another distinct application, portion of application or location.

Asynchronous interfaces allow an asynchronous ingest and an asynchronous publish subscribe interface to the pipeline's output. They may be configured with one or more of the following abilities: get and set volume definitions, get and set file classification definitions, get and set new entity types, and get and set pipeline profile configurations.

Figure 2:
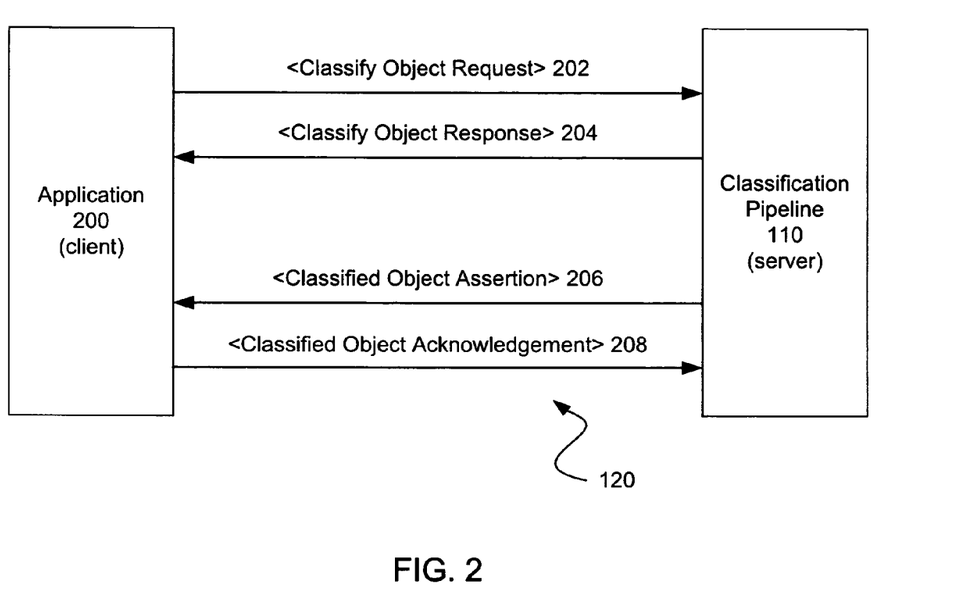
FIG. 2 depicts a block diagram illustrating an asynchronous integration flow of a classification pipeline according to one embodiment of the present invention.

FIG. 2 depicts a block diagram illustrating an asynchronous integration flow of a classification pipeline according to one embodiment of the present invention. In this example, Application 200 may send a <Classify Object Request> 202 ("request 202") to Classification Pipeline 110 with information pertaining to the object on which Application 200 wishes to receive information. The information pertaining to the object sent via request 202 may include information such as the volume on which the object is located or the name of the object. Request 202 may also contain information on the location to which a response to request 202 is to be delivered, such as to what application the response should be delivered, what portion of an application the response should be delivered, or if the response should be stored etc. To facilitate the sending of request 202, request 202 may be formulated according to API 120 or any suitable API that Classification Pipeline 110 is operable to implement.

In response to this initial request 202, Classification Pipeline 110 may send a <Classify Object Response> 204 ("response 204") indicating that request 202 has been received by Classification Pipeline 110 and that information will be delivered to the requested application/location. Classification Pipeline 110 may then operate to obtain or extract metadata on or about the object, or to classify the object according to a set of classification parameters. In one embodiment, the metadata extracted or obtained on the object may be dependent on a level of service specified in conjunction with Classification Pipeline 110.

Once this information has been obtained, Classification Pipeline 110 may send a <Classified Object Assertion> 206 ("response 206"). Response 206 may contain information pertaining to the object on which information was requested in request 202, and may be sent to the location, application or portion of application specified in request 202. Although response 206 is depicted in FIG. 2 as being sent to Application 200, this is for the convenience of depiction and for the purpose of illustration only. Response 206 may be delivered to another application (not shown), a location (not shown), or a certain procedure or portion of Application 202. This information on the object may be metadata pertaining to the object or data contained by the object, or a classification of the object. In one embodiment, metadata in response 206 may be formulated as an XML string.

Upon receiving response 206, Application 200 (or a portion of Application 202) may send a <Classified Object Acknowledgement> 208 ("response 208") acknowledging that the information pertaining to the object has been received.

Figure 3:
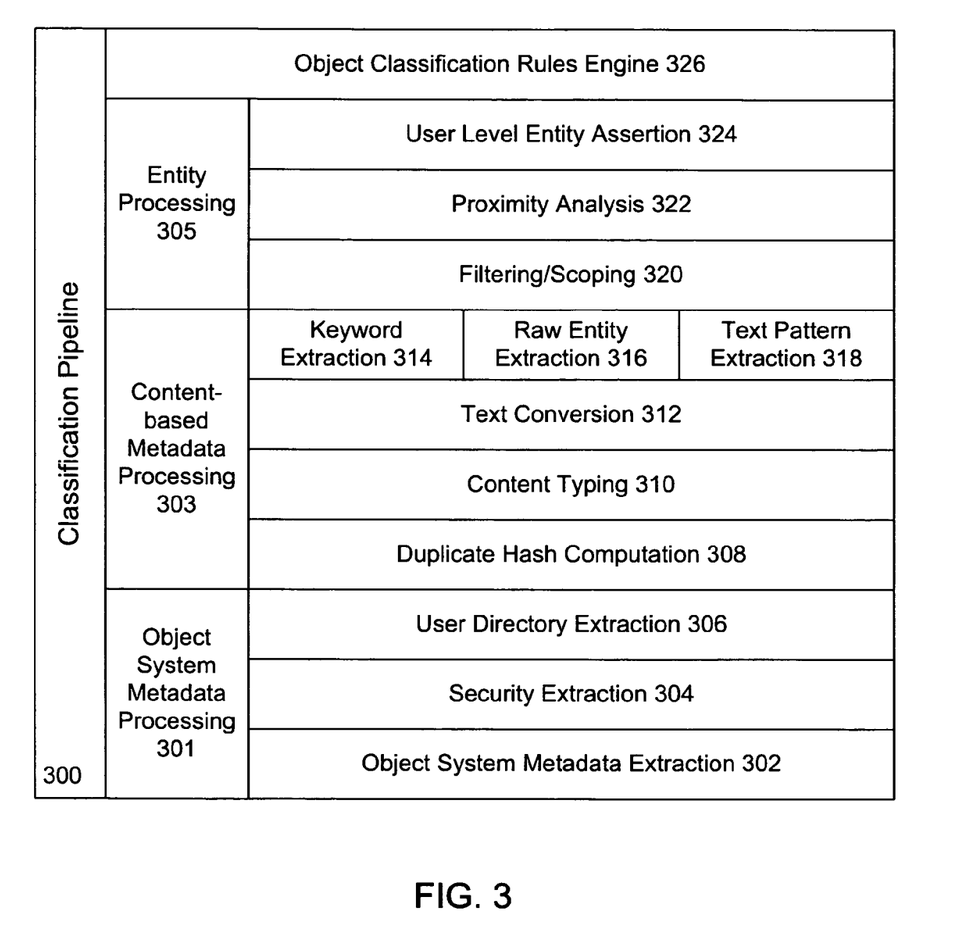
FIG. 3 depicts a classification pipeline according to one embodiment of the invention.

Moving to FIG. 3, one embodiment of a classification pipeline is depicted. Classification Pipeline 300 may comprise a plurality of layers through which metadata can be obtained and/or processed for submission to Object Classification Rules Engine 326. The term "layers" is representative of the various ways in which the functionality of Classification Pipeline 300 may be implemented (e.g., services, stages, etc.). In one embodiment, the functionality of Classification Pipeline 300 can be divided into three levels (Object System Metadata Processing 301, Content-based Metadata Processing 303, and Entity Processing 305).

Object System Metadata Processing 301 may comprise layers 302, 304, and 306 for extracting system-level metadata which pertains to the keeper of the object (e.g., the system on which the object resides, the surrounding systems, the type of filesystem on which the object resides, the security settings pertaining to the object, other filesystem information such as user directories, etc.). Current filesystems generally provide ample amounts of system metadata. Object System Metadata Extraction 302 may operate to extract raw system metadata pertaining to the location and type of filesystem on which an object resides. This can be done by using the volume parameter passed in on the <Object Classification Request>. Each volume has a system type. Object System Metadata Extraction 302 may operate to map available attributes based on the system type. The type of volume is extensible (i.e., new system types can be readily added). Object System Metadata Extraction 302 may operate to collaborate, from within the pipeline and based on detailed information extracted thus far, with other software facilities within a network (e.g., an enterprise policy engine in an enterprise network) to aggregate, enrich, and/or augment the extracted metadata (e.g., the enterprise policy engine may recursively feed analyzed attributes back into Object System Metadata Extraction 302).

Security Extraction 304 may operate to extract an object's security settings such as access permissions. Like system metadata, the security settings are a type of metadata that exist on objects which can be extracted, tagged, and classified via Classification Pipeline 300. The extracted security information can be useful for forensic and/or reporting purposes. For example, one might desire to know, while an object is being tagged, how many times the object had been accessed, when and perhaps by whom. In this way, access behavior may be analyzed based on the extracted security information and the historic value(s) associated therewith.

User Directory Extraction 306 may operate to extract system metadata pertaining to user directories associated with the object. User Directory Extraction 306 can enrich the extracted system metadata with directory information (e.g., the active directory where an object currently resides on a user computer).

Additional system-level processing is possible to extract from the keeper of an object other types of metadata germane to the structure (e.g., file type) of the object (e.g., "Sender" may be germane to "Email", "Author" may be germane to "Document", etc.). The keeper of the object refers to the system(s) on which the object resides. As an example, a client can simply plug in, insert or otherwise add new metadata extraction algorithm(s) or processing layer(s) to Classification Pipeline 300.

Content-based Metadata Processing 303 may comprise layers 308, 310, 312, 314, 316 and 318 for obtaining metadata on an object based upon the content of the object (e.g., free form text of an email or document, etc.). For example, Duplicate Hash Computation 308 may operate to perform a binary hash to detect possible duplicate objects which can then be removed (also called "deduplication"). In one embodiment, another layer (not shown) can be added to perform a text-based hash on the content of the object to see if it has changed semantically. This can be done before extractions 314, 316, 318.

Content Typing 310 may operate to determine the type of object by its content and not by its extension. As an example, a file named "work.doc" may be an .mp3 file in disguise. Determining the type of a document based on what's in it can help to ensure the accuracy of its classification.

Text Conversion 312 may operate to process and prepare the text of the object for content-based extraction operations (e.g., Keyword Extraction 314, Raw Entity Extraction 316, Text Pattern Extraction 318, etc.). Other content-based metadata extraction operations are also possible. In one embodiment, another layer or module (not shown) can be added to remove any ambiguity (also called "the disambiguity" layer") in the content of the object. As one skilled in the art can appreciate, removing ambiguity (e.g., run-on sentences, improper punctuation, extra spaces, tables, dashes or hyphens in words and sentences, etc.) from the content can improve performance. The aforementioned text-based hashing can be performed on the converted text as well.

The converted text next is broken down into speech units (e.g., names, cities, nouns, verbs, etc.) and goes through a battery of extraction processes (e.g., Keyword Extraction 314, Raw Entity Extraction 316, Text Pattern Extraction 318, etc.). These layers of extraction operate to look for keywords, semantic entities, word units, expressions, text patterns, etc. and extract them from the text based on some predetermined parameters (e.g., a client desiring to locate documents discussing patient privacy might specify a list of relevant keywords such as "patient" and "privacy" based on which Keyword Extraction 314 is operable to go through the text and tag documents that contain those keywords). In some embodiments, third party text processing software development kits such as ThingFinder® by Inxight Software, Inc. of Sunnyvale, Calif. can be used to supplement this functionality. Inxight ThingFinder® can automatically identify, tags, and indexes about 35 types of named entities in a document, such as persons, organizations, dates, places, and addresses.

Entity Processing 305 may comprise layers 320, 322, and 324 for processing the object and/or metadata previously obtained from the object. In particular, the object and metadata previously obtained may be combined or analyzed to produce further metadata on the object. In embodiments of the invention, Filtering/Scoping 320 may operate to tag metadata according to predetermined scope(s)/filtering rule(s), which are user-definable. This can be useful in classifying objects in compliance with privacy policies and/or rules. With this functionality, objects may be included (scoping) and/or excluded (filtering) from one or more classes.

Proximity Analysis 322 may operate to tag or select an entity (metadata) based on its proximity or affinity to another entity or entities. For example, to distinguish from all dates a user may specify for Proximity Analysis 322 to find dates in proximity to a particular word or entity. As another example, to find names of people who work in hospitals, a user might first create an entity called "Hospital Names" and distinguish from all names only those that are in proximity to Hospital Names using Proximity Analysis 322. These are examples of proximity-based entities.

At this point, everything about an object is tagged and there could be a plurality of entities (extracted as well as created by the layers in the classification pipeline) of various types. User Level Entity Assertion 324 may operate to normalize these entities and interface with Object Classification Rules Engine 326 for submitting objects and their associated data. In this respect, User Level Entity Assertion 324 can be seen as interfacing between the tagging functionality and the classification functionality of Classification Pipeline 300. That is, an object may move up or through Classification Pipeline 300 as metadata concerning the object continues to be collected, enriched, and augmented. Once it reaches the last node, in this case, Proximity Analysis 322, the tagging aspect of the pipeline is done and User Level Entity Assertion 324 can assert all the data in its aggregate into Object Classification Rules Engine 326.

In one embodiment, Object Classification Rules Engine 326 is operable to classify objects according to a set of rules which define classes for objects based upon various data, metadata or various combinations associated therewith. Each object is classified based on its associated data according to these rules. These classification rules are user-definable and can be expressed in the form of conditions. In one embodiment, a condition has an attribute in terms of a value or value plus instances. In this way, if an object has an entity associated therewith that satisfies a condition, Object Classification Rules Engine 326 may classify that object to be a member of a class having that condition. Once the class membership is asserted, its class can be expressed in terms of another class (i.e., the class becomes the object's another attribute). This complex class membership can be interpreted subsequently during class processing.

Figure 3A:
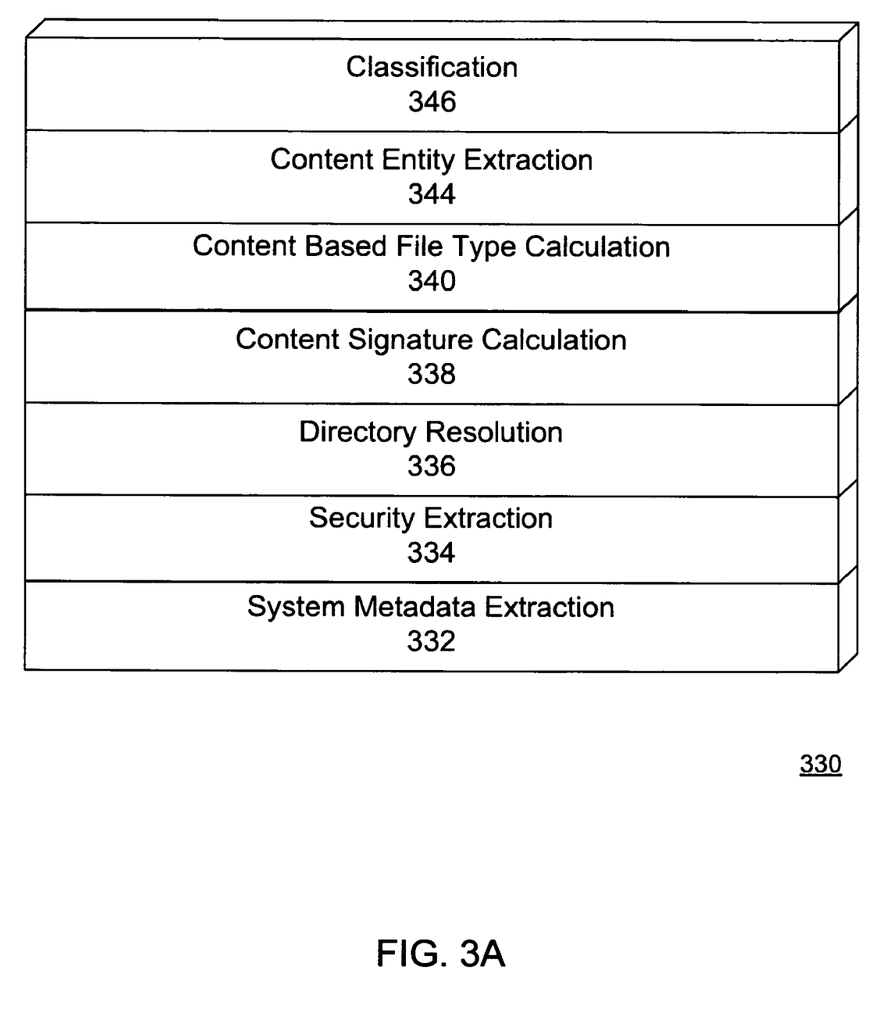
FIG. 3A depicts another exemplary embodiment of a classification pipeline.

It will be apparent to those of skill in the art that the stages or layers 302-326 depicted with respect to Classification Pipeline 300 are exemplary only, and that Classification Pipeline 300 may include more or fewer stages depending on the functionality of Classification Pipeline 300 desired. As an example, FIG. 3A depicts an embodiment of Classification Pipeline 330 comprising layers 332, 334, 336, 338, 340, 344, and 346 for operating on metadata spaces listed in Table 1 below. In one embodiment, layers 332, 334, 336, 338, 340, 344, and 346 are implemented as a set of tagging and extraction services available through a Web interface or an API interface.

TABLE 1

| Metadata Spaces | Description |
| --- | --- |
| Object System | Includes all core metadata acquired from the underlying system where an object resides and includes attributes such as size, creation date, and, modified date. |
| Security | Contains all security information from an object. |
| User Directory | User and group mappings from the current directory of an object. |
| Content Signature | Contains a SHA-160 bit hash of the object being processed. |
| Content-based Typing | Contains a series of attributes representing the type of object derived from an analysis of the object's content. |
| Content Entities | Includes all entities that are located via |

TABLE 1-continued

| Metadata Spaces | Description |
| --- | --- |
|  | text and natural language processing of the object's content. The scope of the entities to be extracted is based on the entities located within the active file classification(s) for the volume specified on the pipeline object classification request. Examples of entities can be found in the attached Appendix B, entitled "Understanding standard entities." |
| Object Classification | Indicates that the pipeline client wants specified objects to be classified against the file classification rules defined for the provided volume. |

In one embodiment, clients (e.g., application 100) of the classification pipeline (e.g., Classification Pipeline 110) can subscribe to specific metadata spaces listed above by defining a pipeline profile. If no pipeline profile is provided (e.g., request 102 contains no pipeline profile), the classification pipe may be configured to provide all sets of metadata.

In embodiments of the invention, any of the above-described layers and options of the classification pipeline can be turned on and off by metadata subscription. As an example, a client may choose to subscribe to a particular profile of the pipeline and configure it accordingly. As another example, a client may choose to tag an object but not classify it.

In some cases, a client may desire to have some dimensions of classification that is germane to a particular application domain, but not necessarily part of the classification pipeline. For example, a class may require its members to contain the name "Steve", be bigger than one megabyte in file size, be created over one year ago, mention a software product called "Classification Pipeline," and references the city of Austin. In one embodiment, a user can pass the classification requirements in from the application domain to the classification engine (e.g., Object Classification Rules Engine 326) and the classification pipeline (e.g., Classification Pipeline 300) can synthesize the user-defined classification requirements with all the tag attributes (e.g., name, size, date, text pattern, keyword, etc.) and feed them into the classification engine to assert classification accordingly. In this way, classification can be done based on dynamically inserted requirements from external applications.

Figure 4:
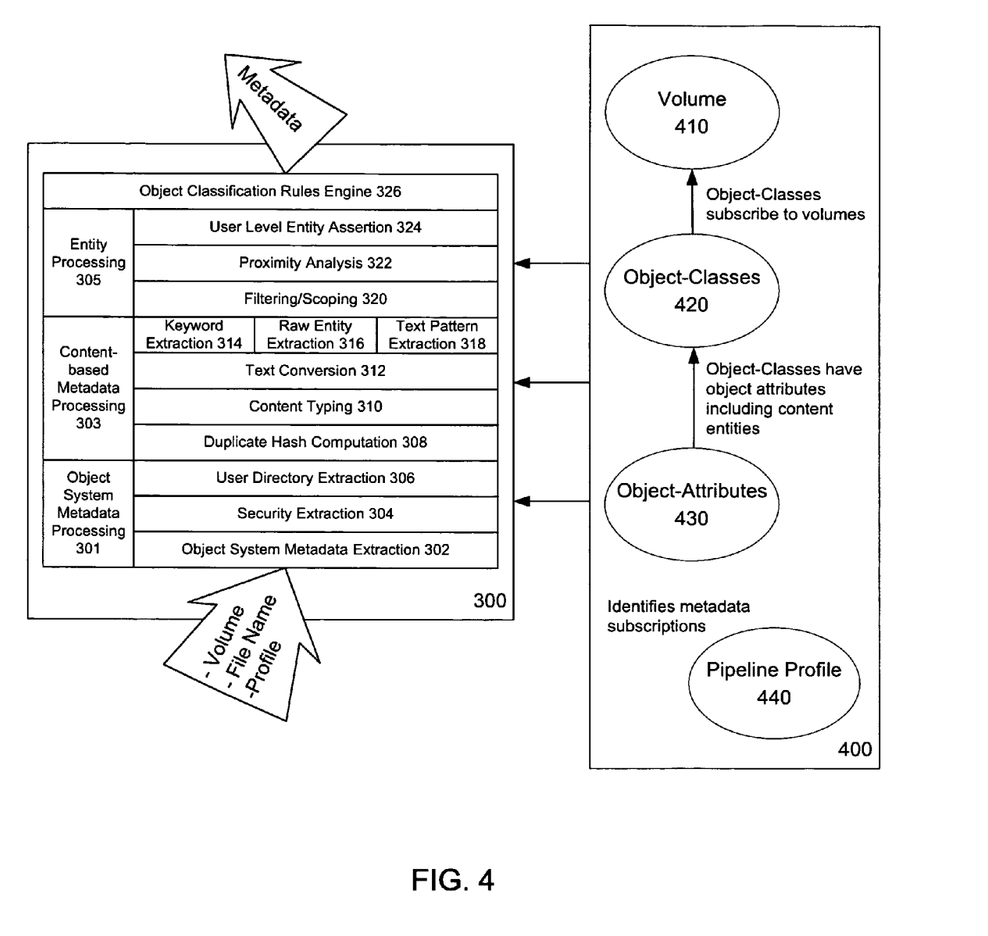
FIG. 4 depicts an exemplary configuration of a classification pipeline according to one embodiment of the invention.

FIG. 4 depicts an exemplary configuration of one embodiment of the classification pipeline, illustrating by example how embodiments of the classification pipeline disclosed herein may be utilized in conjunction with external applications or data. Pipeline configuration can be controlled via an application web interface, or through an API exposed as a series of XML request and replies over TCP. The example shown in FIG. 4 exemplifies pipeline configuration via the API and adopts the following terminology:

Object-Class—consists of one or more conditions, all of which can be combined by an "AND" and "OR" Boolean operations or instance requirement counts.

Condition—consists of a single Object-Attribute and value/occurrence based expression whose scope is constrained by the Object-Attribute properties. For the purpose of inclusion within an Object-Class, a condition on an Object-Attribute has the following dimensions.

Object-Attribute—consists of file system metadata, content based data, and user-defined (i.e., custom) attributes. Each Object-Attribute can have the following properties:

Base Type (e.g., String, Integer, Date, Occurrence)
Sparse or Dense Indicator
Single or Multiple Instance
Data Values or Partial Data values (is, contains, begins with, ends with, regular expression values)
Object-Attribute Tagging/Extraction Implementations—can be Core or Custom:
  Core Object-Attributes—default object-attributes provided by the classification pipeline.
  Custom Object-Attributes—object-attributes created by applications (including the classification pipeline) users, available for viewing and updating. Custom Object-Attributes can have the following types:
    Keyword—Custom Object-Attributes
    Regular Expression-based—Custom Object-Attributes There are four types of pipeline configuration objects that control the behavior of the classification pipeline: Volumes, Pipeline-Profile, Object-Attributes, and Object-Classes. In the example shown in FIG. 4, pipeline configuration objects 400 (Volume 410, Object-Classes 420, Object-Attributes 430, and Pipeline Profile 440) control the behavior of Classification Pipeline 300.

Volume—A volume is an aggregation of data needed to address a repository of objects somewhere on the network. A volume can include the name of the server, the name of the share, the protocol to be used in communicating with the server, authentication credentials (if applicable to the protocol), a starting directory from which subsequent file requests are relative, and an include directory regular expression. The latter two items can allow for specification of subsections of share when it is desirable to logically break up a network share.

Pipeline-Profile—A pipeline-profile comprises a series of options that control which sets of metadata are extracted from an object as it passes through the pipeline. Following the example shown in FIG. 3A, these options may include the following:
  Enable/disable content signature calculation;
  Enable/disable system metadata extraction;
  Enable/disable content based object file-type calculation;
  Enable/disable classification engine;
  Enable/disable directory resolution;
  Enable/disable extraction of security information;
  Enable/disable the extraction of content Object-Attributes; and
  Maximum number of content Object-Attributes to extract per type per object.

Object-Attribute—depending upon implementation, Object-Attributes can fall into two categories: core or custom. Core Object-Attributes are provided with the classification pipeline and are immutable. The definition of custom Object-Attributes is controlled by the user. "Person" and "Address" are examples of core Object-Attributes. One embodiment of the invention supports two custom Object-Attribute types, keyword and regular expression. Users can create and modify custom Object-Attributes of these types. Since Object-Attributes are the vocabulary upon which Object-Classes are built, the ability to add custom Object-Attributes allows a user to extend this vocabulary.

Object-Attributes have the following properties:
  Name—name of the Object-Attribute;
  Custom—(Boolean) determines whether Object-Attribute is of type custom;
  Base-type—integer, date, string, occurrence;
  Dense—(Boolean) determines whether the Object-Attribute is dense or sparse (i.e., is it always present); and
  Multi-instance—(Boolean) determines whether multiple instances are possible.

The latter four determine what conditions can be applied to a particular Object-Attribute.

Object-Class—An Object-Class is a collection of conditions expressed across Object-Attributes. Each condition within an Object-Class enumerates value/instance-based expressions across a single Object-Attribute. An Object-Class may be associated with one or more volumes and there can be multiple Object-Classes associated with a given Volume. One example of an Object-Class is defined as a path containing a sub-string "home" AND the presence of a social security number (SSN) and is associated with all volumes. In this case, the conditions are:
  Object-Attribute—path
    Condition—contains "home"
  Object-Attribute—SSN
    Condition—at least one time.

Referring to FIG. 4, Classification Pipeline 300 may receive Volume 410 specifying a location on a filesystem, a filename or object name, or a profile of an object which may indicate which objects to process through Classification Pipeline 300 or which may indicate services within Classification Pipeline 300 are desired. Utilizing some of this information, Classification Pipeline 300 may extract metadata and classification information on the object and pass this metadata or classification to another application.

As described above, Classification Pipeline 300 may be utilized in conjunction with configuration data 400 to tailor classification pipeline. Pipeline Profile 440 received by Classification Pipeline 300 may indicate desired layers or services of Classification Pipeline 300 (e.g., extract security information but no hash computation) or may indicate how Classification Pipeline 300 is to be set up. Other configuration data may include various volumes of filesystems, particular servers, protocols or various access information associated with objects on which Classification Pipeline 300 is to operate. Objects classes may be defined by rules which define classes to which objects may belong. These object classes may be associated with certain volumes or filesystem types such that when files from a particular filesystem or filesystem type are processed by Classification Pipeline 300, Classification Pipeline 300 may determine if these objects are of that class.

Components of the classification pipeline disclosed herein can be controlled programmatically through an XML over TCP interface. For example, a plurality of methods can be provided to GetAll, Get, Create, Update, and Delete for each of the pipeline configuration objects 400 described above. An exemplary breakdown of methods, parameters, parameter descriptions, types, and return values is attached to this disclosure as Appendix C. Other implementations are also possible.

Figure 5:
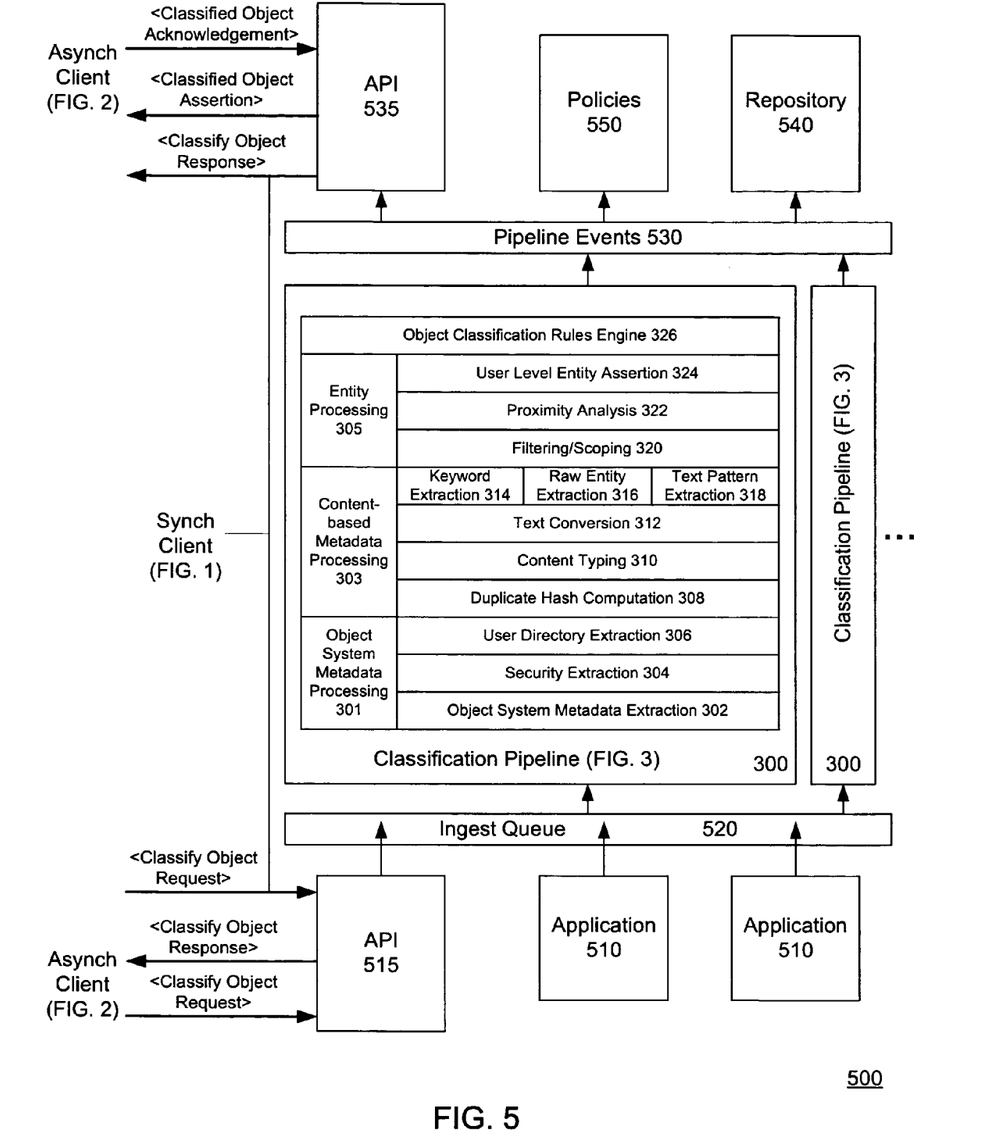
FIG. 5 depicts an exemplary system implementing one embodiment of the invention.

Embodiments of the classification pipeline disclosed herein may be utilized as part of a broader system. One embodiment of such a system 500 is depicted in FIG. 5. Classification Pipeline 300 may interface with a set of applications 510 (e.g., StoredIQ Walkers, StoredIQ Event Sinks, etc.) designed to provide objects and object data to an ingest queue 520 where objects to be processed by Classification Pipeline 300 are organized. Ingest queue 520 may be operable to implement an API 515 such that information on objects may be provided to ingest queue 520. For example, if applications 510 which may be provided in conjunction with Classification Pipeline 300 only cover a certain set of filesystems, the "external" API 515 may allow objects in a filesystem outside the set of filesystems to be classified by Classification Pipeline 300 by passing information on the object, or the object itself, to ingest queue 520. This information on an object or the object may be passed in by a third party application or any other application that wishes to utilize the capabilities of Classification Pipeline 300.

From ingest queue 520 objects are then processed by Classification Pipeline 300. The processing of these objects may lead to one or more pipeline events 530. These pipeline events may be the fact that an object has been classified a certain way, that certain metadata of an object comports with certain criteria, etc. Based on the pipeline events generated, metadata or other object data may be stored to a repository 540 and/or utilized to implement policies 550 and/or inform applications (e.g., a Web application external to Classification Pipeline 300) through API 535. Policies may be actions to be taken and may for example be based upon the classification of an object. These policies may be either predefined or user defined, such that system 500 may take user-defined actions based upon a pipeline event. These pipeline events or other results of processing by Classification Pipeline 300 may also be reported using API 535 as discussed above, such that client applications may receive requested information on objects that have been processed by Classification Pipeline 300.

Figure 6:
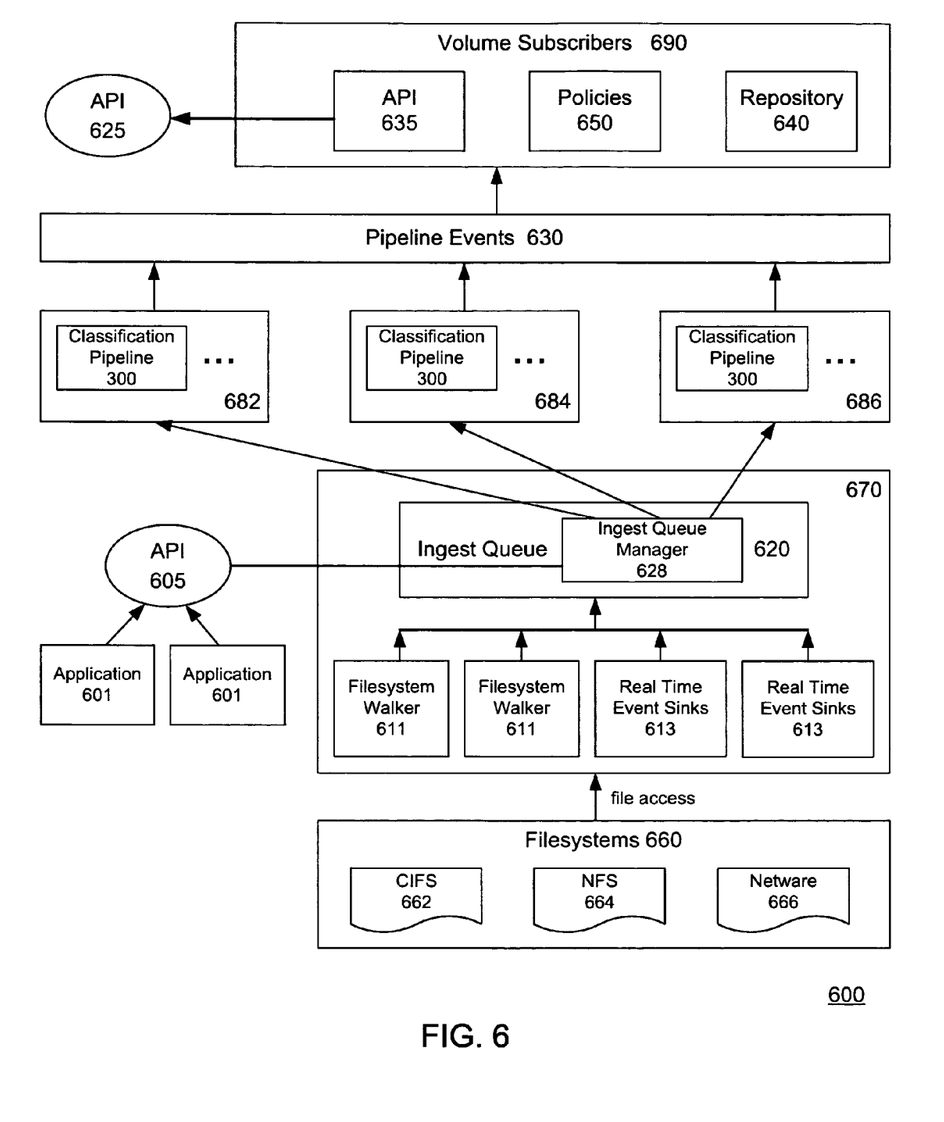
FIG. 6 depicts one embodiment of an exemplary architecture for the implementation of a system for processing objects through classification pipelines.

FIG. 6 depicts one embodiment of an exemplary architecture for the implementation of a system 600 for processing objects using a cluster of classification pipelines disclosed herein. Filesystems (e.g., CIFS 662, NFS 664, Netware 666 in a network Filesystem environment 660) may be accessed by various applications (e.g., Filesystem Walkers 611, Real Time Event Sinks 613) to obtain objects as well as information on objects in these filesystems and events pertaining to these systems. These applications may place these events and information into a pipeline queue (e.g., Ingest Queue 620) which is managed by a queue manager (e.g., Ingest Queue Manager 628). Additionally, an external interface (e.g., API 605) may allow external applications (e.g., Applications 601) to provide information on objects in external filesystems to the pipeline queue.

From this queue (e.g., Ingest Queue 620), the queue manager (e.g., Ingest Queue Manager 628) may distribute objects to computer nodes (e.g., nodes 682, 684, 686), each which is operable to implement one or more instances of a classification pipeline (e.g., Classification Pipeline 300), or a subset thereof. Thus, each of the objects in the queue may be processed by an instance of a classification pipeline implemented on a node. The processing of these objects by the instances of the classification pipeline on the various nodes results in the generation of various pipeline events (e.g., Pipeline Events 630). The pipeline events may result in the various actions taken by volume subscribers (e.g., Volume Subscribers 690) based upon the volume with which the object that caused a pipeline event to be generated is associated. Thus, if a pipeline event was generated based upon an object in a certain volume, the pipeline event, object metadata or other information associated with the object may be stored in a repository or storage location (e.g., Repository 640). Additionally, the pipeline event, object metadata or other information associated with the object may implement some predefined policies (e.g., Policies 640) and/or be reported to external applications through an external interface (e.g., API 625), as described above.

It will be apparent from the above descriptions that many other architectural arrangements may be implemented and utilized in conjunction with embodiments of the classification pipeline disclosed herein.

Although the present invention has been described in detail herein with reference to the illustrative embodiments, it should be understood that the description is by way of example only and not to be construed in a limiting sense. It is to be further understood, therefore, that numerous changes in the details of the embodiments of this invention and additional embodiments of this invention will be apparent to, and may be made by, persons of ordinary skill in the art having reference to this description. Accordingly, the scope of the invention should be determined by the following claims and their legal equivalents.

What is claimed is:

1. A computer-implemented method of classifying objects, comprising:

providing a set of user-configurable services from a classification pipeline server machine to a plurality of filesystem client machines across a network via an interface for a classification pipeline, wherein said classification pipeline comprises a plurality of processing layers and said layers comprise a first layer for extracting system metadata, a second layer for extracting security information, a third layer for extracting user directory information, a fourth layer for removing duplication, a fifth layer for determining a file type based on content, a sixth layer for converting said content into text, a seventh layer for removing ambiguity from said text, an eighth layer for extracting keywords from said text, a ninth layer for extracting raw content-based entities from said text, and a tenth layer for extracting text patterns from said text;

receiving at said classification pipeline server machine through said interface for said classification pipeline a request from a filesystem client machine to obtain information on an object in a filesystem;

obtaining or extracting metadata on or about said object;

tagging or classifying said object according to a set of classification rules expressed across said metadata;

formulating a response at said classification pipeline server machine, wherein said response comprises said metadata, data contained by said object, a classification of said object, tagged entities found within content of said object, or a combination thereof; and communicating said response from said classification pipeline server machine to said filesystem client machine.

2. The computer-implemented method of claim 1, further comprising formulating said request according to said interface.

3. The computer-implemented method of claim 2, wherein said interface is a Web interface, a remote procedural call interface, or an Applications Programming Interface.

4. The computer-implemented method of claim 1, wherein said request passes a set of parameters to said classification pipeline for said object.

5. The computer-implemented method of claim 4, wherein said set of parameters include required parameters and wherein said required parameters include Volume and File Name.

6. The computer-implemented method of claim 5, wherein said set of parameters further include optional parameters.

7. The computer-implemented method of claim 1, further comprising enabling clients to subscribe to one or more of said user-configurable services.

8. The computer-implemented method of claim 7, further comprising enabling said clients to configure subscribed services.

9. The computer-implemented method of claim 1, wherein each of said set of classification rules comprises a condition which enumerates expressions across a single attribute of said object.

10. A tangible computer-readable memory encoded with computer-executable instructions of a computer program for:
  providing a set of user-configurable services from a classification pipeline server machine to a plurality of filesystem client machines across a network via an interface for a classification pipeline, wherein said classification pipeline comprises a plurality of processing layers and said layers comprise a first layer for extracting system metadata, a second layer for extracting security information, a third layer for extracting user directory information, a fourth layer for removing duplication, a fifth layer for determining a file type based on content, a sixth layer for converting said content into text, a seventh layer for removing ambiguity from said text, an eighth layer for extracting keywords from said text, a ninth layer for extracting raw content-based entities from said text, and a tenth layer for extracting text patterns from said text;
  receiving at said classification pipeline server machine through said interface for said classification pipeline a request from a filesystem client machine to obtain information on an object in a filesystem;
  obtaining or extracting metadata on or about said object;
  tagging or classifying said object according to a set of classification rules expressed across said metadata;
  formulating a response at said classification pipeline server machine, wherein said response comprises said metadata, data contained by said object, a classification of said object, tagged entities found within content of said object, or a combination thereof; and
  communicating said response from said classification pipeline server machine to said filesystem client machine.

11. The computer-readable memory of claim 10, wherein said request is formulated according to said interface and wherein said interface is a Web interface, a remote procedural call interface, or an Applications Programming Interface.

12. The computer-readable memory of claim 10, wherein said request passes a set of parameters to said classification pipeline for said object.

13. The computer-readable memory of claim 12, wherein said set of parameters include required parameters and wherein said required parameters include Volume and File Name.

14. The computer-readable memory of claim 13, wherein said set of parameters further include optional parameters.

15. The computer-readable memory of claim 10, further comprising computer-executable instructions for enabling clients to subscribe to one or more of said user-configurable services.

16. The computer-readable memory of claim 10, further comprising computer-executable instructions for enabling said clients to configure a profile of said classification pipeline.

17. A computer system implementing a classification pipeline for classifying objects in a network environment, said computer system comprising a computer-readable storage medium encoded with computer-executable instructions for:
  providing a set of user-configurable services from a classification pipeline server machine to a plurality of filesystem client machines across a network via an interface for a classification pipeline, wherein said classification pipeline comprises a plurality of processing layers and said layers comprise a first layer for extracting system metadata, a second layer for extracting security information, a third layer for extracting user directory information, a fourth layer for removing duplication, a fifth layer for determining a file type based on content, a sixth layer for converting said content into text, a seventh layer for removing ambiguity from said text, an eighth layer for extracting keywords from said text, a ninth layer for extracting raw content-based entities from said text, and a tenth layer for extracting text patterns from said text;
  receiving at said classification pipeline server machine through said interface for said classification pipeline a request from a filesystem client machine to obtain information on an object in a filesystem;
  obtaining or extracting metadata on or about said object;
  tagging or classifying said object according to a set of classification rules expressed across said metadata;
  formulating a response at said classification pipeline server machine, wherein said response comprises said metadata, data contained by said object, a classification of said object, tagged entities found within content of said object, or a combination thereof; and
  communicating said response from said classification pipeline server machine to said filesystem client machine.

18. The computer system of claim 17, further comprising a plurality of nodes residing in said network environment, wherein each of said plurality of nodes is operable to execute one or more instances of said classification pipeline.

19. The computer system of claim 17, wherein said request is a Web interface, a remote procedural call interface, or an Applications Programming Interface.

* * * * *